May 29, 1934.  D. J. FINNIE ET AL  1,960,335

CHECK VALVE

Filed April 17, 1933

Elza. W. Greer
Dewey J. Finnie

INVENTORS.

Patented May 29, 1934

1,960,335

UNITED STATES PATENT OFFICE 1,960,335

CHECK VALVE

Dewey J. Finnie, Highland Park, and Elza W. Greer, Detroit, Mich.

Application April 17, 1933, Serial No. 666,468

1 Claim. (Cl. 210—166)

This invention pertains to a novel check valve, adapted to be used with volatile liquids. The primary object of the present invention is to provide a durable, inexpensive and highly leakproof check valve, capable of sustaining its efficiency for a considerable time, and to attain this object the invention utilizes a vitreous spherical member, resting in a metalloid seat constructed of plastic insoluble synthetic resin, like bakelite or a similar substance, which provides a more resilient, temperature resisting and secure seat than would be possible by the use of metal.

With the above and other ends in view, the invention consists in matters herein after set forth, and more particularly pointed out in the appended claim, reference being made to the accompanying drawing, in which:

Figure 1:
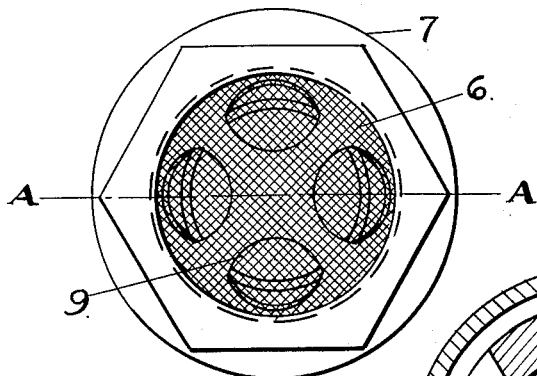
Fig. 1 is a plan view of the present device.
Figure 3:
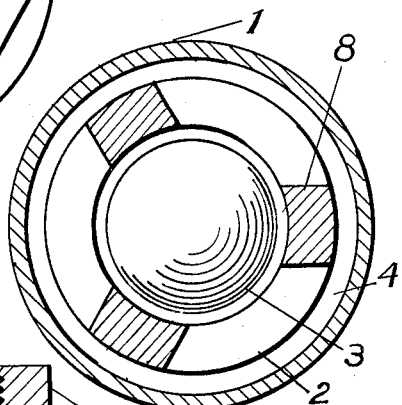
Fig. 3 represents a cross sectional view on line B—B of Fig. 2.
Figure 2:
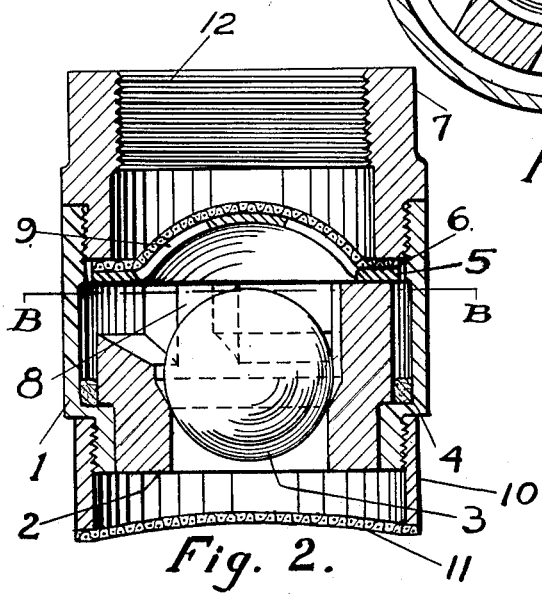
Fig. 2 is a cross sectional view on line A—A of Fig. 1.

Like characters of reference are employed throughout to designate the corresponding parts. The numeral (1) indicates a housing carrying in it the vitreous spherical member (3) resting upon and within the valve seat (2) principally constructed of plastic metalloid and sealed against the wall of housing (1) by means of packing (4), screwed to the lower threaded portion of housing (1) is the collar (10) to which is attached protecting screen (11) resting upon the prongs (8) of the valve seat (2) is cover (5) provided with several holes (9) for the passage of the liquid and protected by screen (6). The nut (7) is screwed into the housing (1) at the same time holding down the screen (6), cover (5), and valve seat (2). The threaded portion (12) is for the application of a suction pipe.

Various changes may be made in the details of the construction without departing from the spirit of the invention as set forth in the appending claim.

What we claim is:

In a check valve, the combination of a valve housing having inlet and outlet openings, a valve seat mounted within said housing, consisting of a plastic metalloid and having prongs projecting therefrom, a valve ball mounted upon said seat and within said prongs, whereby said prongs form guides for said valve ball, a screen mounted upon the ends of said prongs adjacent said outlet opening, a connector member threaded into said outlet opening and contacting with said screen to hold it in place on the ends of said prongs, and a screen cap at the inlet opening of said casing.

DEWEY J. FINNIE.
ELZA W. GREER.